April 15, 1947.  L. S. HARTMAN  2,418,834
AUTOMATIC RADIO COMPASS DEMONSTRATOR
Filed June 8, 1945  2 Sheets-Sheet 1
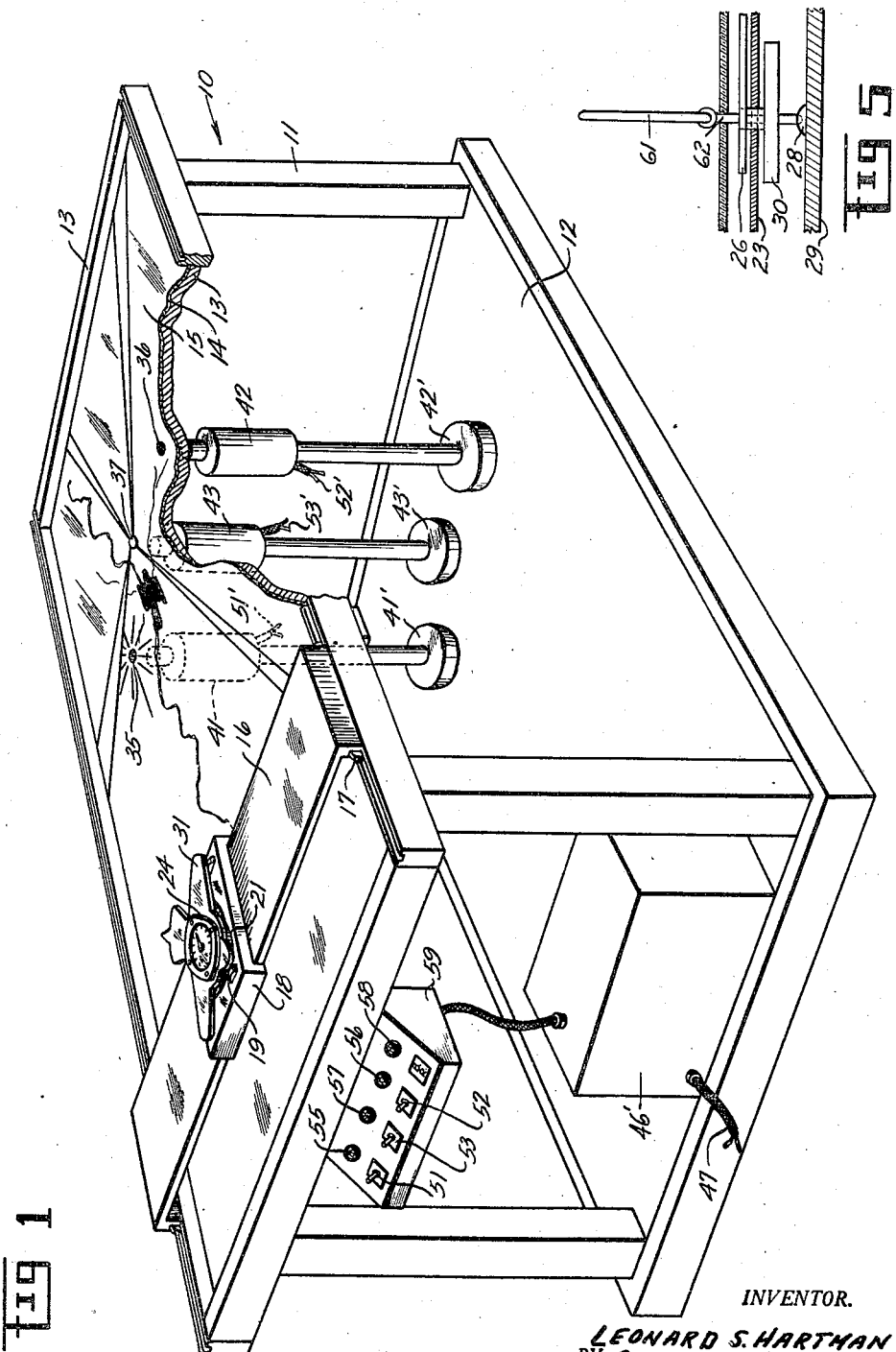
INVENTOR.
LEONARD S. HARTMAN
BY
ATTORNEYS April 15, 1947.  L. S. HARTMAN  2,418,834
AUTOMATIC RADIO COMPASS DEMONSTRATOR
Filed June 8, 1945  2 Sheets-Sheet 2
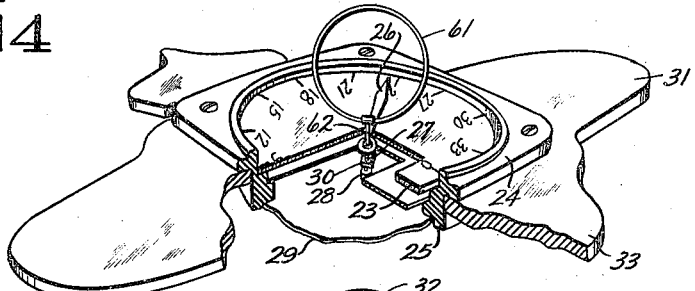
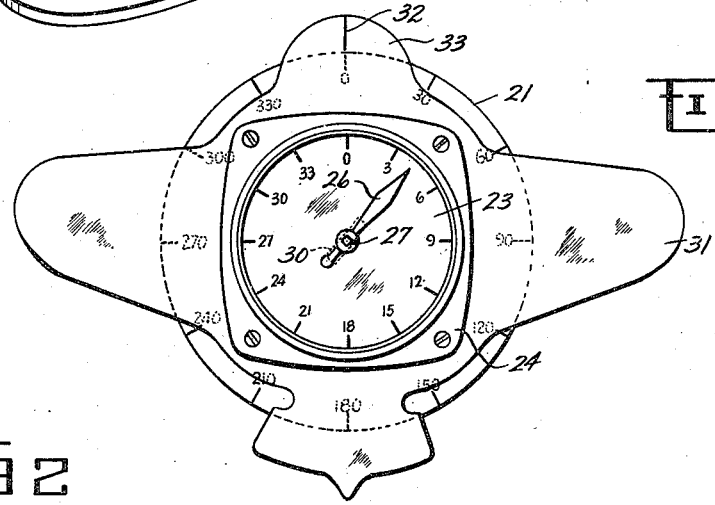
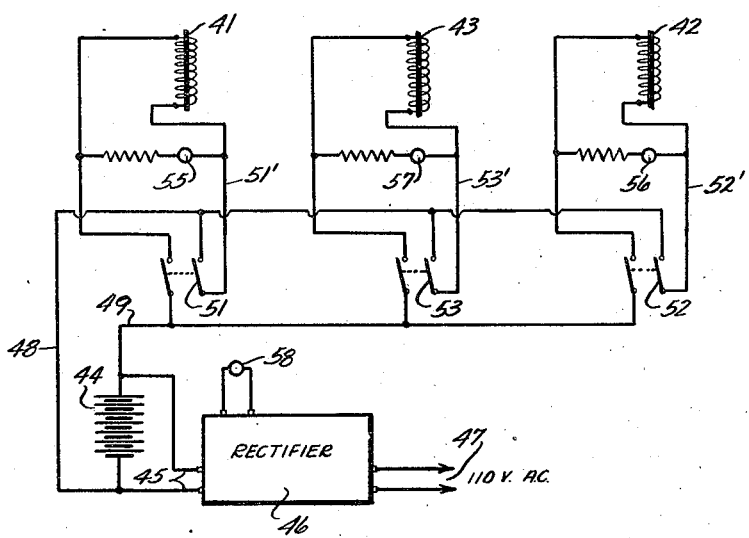
INVENTOR.
LEONARD S. HARTMAN Patented Apr. 15, 1947

2,418,834

UNITED STATES PATENT OFFICE 2,418,834

AUTOMATIC RADIO COMPASS DEMONSTRATOR

Leonard S. Hartman, Murfreesboro, Tenn.

Application June 8, 1945, Serial No. 598,357

6 Claims. (Cl. 35—39)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an improved device for teaching aviation students the automatic radio compass and aural null procedures and techniques.

An essential object of this invention is to provide an improved ground device for demonstrating visually directly to the students in aviation the techniques of an automatic radio compass and similar direction finding devices utilized during flight.

Another object of this invention is to provide a device, especially adapted for use supplemental to the customary exercises in the Link trainer, for demonstrating the principles of an automatic radio compass and the like, which device is simple in construction, is inexpensive in manufacture, and will require a minimum of space in operation.

A further object of this invention is to provide such a device for demonstrating the use of an automatic radio compass, etc., and whereby furthermore to illustrate the electrical disturbance caused on such compass by a storm cloud or thunderhead.

A further object of this invention is to provide such an improved device whereby to visually demonstrate aural null procedure as well as that of the automatic radio compass.

These and various other objects and advantages are attained with this invention, as will become apparent from the following description, taken in connection with the accompanying drawings wherein this invention is shown in its preferred form, it being evident that other arrangements and forms of construction may be resorted to for carrying out the objects and purposes of this invention.

In the drawings:

Fig. 1 is a perspective view of an automatic radio compass demonstrator embodying this invention.

Fig. 2 is a schematic wiring diagram illustrating this invention.

Fig. 3 is a plan view of the simulated airplane with the automatic indicator dial and connected parts.

Fig. 4 is a perspective view of said airplane and dial, partly broken away, with the loop applied thereto for demonstrating the aural null principle.

Fig. 5 is an enlarged sectional view showing the aural null loop mounted on the pivot pin which carries the needle and the bar magnet.

This demonstrating device comprises a supporting member 10 which is shown in Fig. 1 in the form of a table comprising legs 11 supported on a base or platform 12 and having the table top 13 secured thereon.

A radio chart 14, which illustrates the desired radio area to be used in connection with this device, is removably mounted on said top, and as indicated in Fig. 1 a glass cover 15 is mounted over the chart thus protecting it and providing a smooth upper surface. The chart 14 is readily removable so as to facilitate substituting for it some other radio area chart desired to be utilized for the demonstration.

The means provided for supporting and moving the radio compass over the glass cover 15 and the chart 14 thereunder comprises a bridge 16 which is relatively long and is preferably of transparent material, said bridge being mounted by wheels 17 on the table top 13 to travel thereover in a direction lengthwise of the table and sidewise of the bridge. A runner 18, which is preferably of transparent material, is mounted by wheels 19 on said bridge to travel lengthwise of the bridge and thus in a direction laterally of the table and at right angles to the travel of said bridge, thereby affording free movement of the runner in any direction and along any path over the chart.

A compass rose 21, sluch as is used on a Link trainer chart, is secured around an aperture provided centrally in the runner 18, having its north placed in line with the longitudinal axis of the bridge. Said rose is preferably covered with a thin sheet of transparent material for protection.

An indicator dial 23 is provided with a frame 24 including a tubular neck 25 and is therewith mounted in the central aperture in the runner 18, so as to be normally retained in position but to be rotatable by hand in said runner. The indicator needle 26, which is movable over the dial, is mounted on a pivot pin 27 which extends through the dial and has its lower end set for free rotation in a jewel 28 supported by a bottom plate 29. A permanent magnet or bar magnet 30 is mounted below the dial on the lower part of said pivot pin 27, being aligned with the needle and rotary with said needle and pin. A member 31, simulating or bearing the outline of an airplane and being made from transparent material such as Plexiglas, is provided with a hole therein to fit around the neck 25 of the dial frame 24 and is secured to said frame, as indicated in the drawings. A line 32 is inscribed on the underside of the nose part 33 of said airplane, in line with the 0° on dial 23, to serve as a reference point for the magnetic heading of the airplane.

The chart 14 illustrated in Fig. 1 as being used with this demonstrator shows an area including the commercial radio broadcasting stations 35 and 36, and the bearing lines radiating from one of said stations to indicate that either one of these stations may be energized for attracting the compass needle and for simulating the emanation of radio signals, and along therewith also shows the 4 legs of the Nashville radio range with its range signal station 37, since said range is the one used at the Smyrna Army Air Field, Smyrna, Tennessee, where this demonstration has been developed and found highly valuable in teaching aviation students visually the automatic radio compass procedure, especially as a supplement to the usual exercises in the Link trainer. This demonstrator furthermore enables pilots to visualize compass techniques and procedures for use with the Signal Corps radio compass receiver.

A plurality of electromagnets are provided with this demonstrator and, for the illustrated area chart, these include electromagnets 41, 42, and 43 which are located respectively directly underneath the simulated commercial radio stations 35 and 36 and the nearby radio range station 37. These electromagnets are adjustably supported by their feet 41', 42' and 43' on the base 12, and are placed under the table top 13 directly beneath each station on the chart.

The electrical circuit for the electromagnets is preferably operated on a 24 v. battery, being shown in Fig. 2 as a battery 44 which is connected by conductor wires 45 to a rectifier 46, said rectifier being connected by means 47 to a 110 v. alternating current line. Fig. 1 indicates the power source housed in a casing 46'. Said battery is connected by conductors 48 and 49 to switches 51, 52, and 53 and from them through conductors 51', 52' and 53' to the electromagnets 41, 42, and 43, pilot lamps 55, 56, and 57 being interposed in said conductors. A 110 v. pilot lamp 58 is connected to the rectifier 46 to indicate when it is operating. Said pilot lamps and switches are located on a panel switch box 59 mounted on the table.

In operating this demonstrator, an electromagnet is switched on and, due to the attraction of the bar magnet 30, the needle 26 is thereby caused to point to the radio station positioned over that energized electromagnet. As the indicator dial with the simulated airplane can be turned through 360° in the runner, and can also be moved in any desired direction over the chart by movement of the runner and the bridge, by hand by either the instructor or the student, homing, bearing interception, tracking, to and away from the station, obtaining radio fixes, and automatic radio compass letdowns can be demonstrated. Before beginning problems demonstrating bearing interception and tracking, the range leg or the bearing line to be intercepted or tracked should be aligned with the earth's magnetic north, which is done by turning the table with its energized electromagnet in that direction.

The attractions and deflections of the compass needle due to storm clouds or thunderheads can also be demonstrated visually with this device. This is done while making good a definite track to one of the radio stations, station 35 for example, the magnet 41 of which has been energized, and the vicinity around another radio station, as the more distant station 36, may then be considered as the thunderhead area. The electromagnet 42 for station 36 is herewith also energized, along with the previously energized electromagnet 41. Consequently, although still tuned to station 35, the indicator needle will be deflected and drawn away from said original station 35 toward the station 36, thereby illustrating the electrical disturbance caused on the compass by a thunderhead.

Aural null procedure can also be demonstrated by the use of this device, which may be readily done by supplying a loop antenna to the compass needle. A simple way is to mount a wire loop 61, approximately 2 inches in diameter over the needle 27, so that it may be placed to have the plane of the loop extending at right angles to the needle, as is customary with such devices. Fig. 5 indicates one of several ways how this can be conveniently done by mounting the loop 61 by means of a stem 62 pressed into a pocket provided in the top of the pivot pin 27 so as to be retained frictionally in position therein. Thus the loop can be turned manually and with the needle will turn along therewith and will extend in a direction axially of the loop. The electromagnets are not energized when this device is used during such aural null demonstrations. By this arrangement the loop 61 with its stem 62 can be readily mounted on the compass needle 27 to be used therewith for aural null demonstration, and can likewise be readily removed therefrom when the device is utilized for demonstrating automatic radio compass principles.

I claim:

1. A device for visually demonstrating to a student in aviation the behavior of the compass and enable the student to learn about the procedure to be followed in using a radio compass, said device comprising a table supporting on its top a chart simulating an area with several radio broadcasting stations emanating radio signals, electromagnets mounted beneath the table top, one of which is placed underneath each one of the simulated radio stations, means for selectively energizing any one of said electromagnets, a simulated airplane having a compass indicator dial fixed thereon and also a needle movable over the dial, supporting means mounted movably on the table top and wherein the airplane and dial are mounted to be freely rotated therein and movable therewith by hand in any direction over the chart, and a permanent magnet connected with said needle to move therewith, being attracted by the electromagnet that is energized, whereby to actuate the compass needle and demonstrate visually the principle of the automatic radio compass.

2. The subject matter set forth in claim 1, and wherein a second electromagnet may be selectively energized along with the first said energized electromagnet and thereby deflect the compass needle to simulate the effect of a thunderhead on the compass during flight.

3. A device for visually demonstrating to a student in aviation the behavior of the compass and enable the student to learn about the procedure to be followed in using a radio compass, said device comprising a table supporting on its top a chart simulating an area with several radio broadcasting stations that emanate radio signals, a plurality of electromagnets adjustably mounted under the top of the table, one placeable underneath each one of said stations, thus facilitating use of this device with various charts of different areas, means for selectively energizing any one of said electromagnets, a bridge movable on the table and bearing thereon a movable runner, whereby said runner is movable manually in any direction over said chart, a simulated airplane and a compass dial being together mounted rotatably on said runner to be operated by hand, a pivot pin extending rotatably through the dial and carrying at its upper end a compass needle movable over the dial, and a magnet secured to the lower part of said pivot pin underneath the dial to swing with the needle and be attracted by the energized electromagnet, whereby the compass needle is directed toward said electromagnet and the superposed station for visually demonstrating automatic radio compass procedure.

4. The subject matter set forth in claim 3, wherein the needle is secured on a pivot pin which is rotary in the simulated airplane and dial, and a wire loop is mounted on said pivot pin, whereby furthermore to provide a compass needle having a loop set with its plane at right angles to the needle and which are together adjustable on said dial for demonstrating aural null procedure.

5. A device for visually demonstrating the behavior of the compass and the procedure to be followed in using an automatic radio compass in aviation, said device comprising a table supporting on its top a chart simulating an area provided with several radio stations emanating radio signals, electromagnets adjustably supported by the table under said top, one placed underneath each one of said stations, means for selectively energizing any one of said electromagnets, a member mounted to be moved freely in a certain direction over the table and bearing a runner movable freely on said member at right angles to said direction, whereby said runner is readily movable in any direction over said chart, a compass rose mounted around an aperture in said runner, a simulated airplane and a compass dial being together mounted rotary in said aperture to be moved by hand, a pivot pin extending rotatably through the dial and having secured to its upper end a compass needle movable over the dial, and a bar magnet secured to the lower part of said pivot pin and located underneath the dial to be attracted by the energized electromagnet, whereby the compass needle is directed toward said electromagnet and the superposed station to enable the student to visualize automatic radio compass procedure.

6. A device for visually demonstrating the behavior of the compass and the procedure to be followed in using an automatic radio compass in aviation, said device comprising a table supporting on its top a chart simulating an area including several commercial radio broadcasting stations having bearing lines extending radially therefrom to simulate emanation of radio signals and also a nearby radio range signalling station, electromagnets adjustably supported by the table under said top, one placed underneath each one of said stations, means actuated for selectively energizing any one of said electromagnets under one of said stations, a bridge on wheels mounted to move in one direction over the table and bearing a runner movable freely on said bridge at right angles to said direction, whereby said runner is freely movable manually in any direction over said chart, a compass rose mounted in an aperture in said runner, a frame carrying a compass dial therein and also carrying a simulated airplane of transparent material, the frame with said dial and airplane being mounted together in the aperture in said runner and compass rose to be rotated therein by hand and moved readily with the bridge and runner over the chart, a pivot pin extending rotatably through the dial and carrying on its upper end a compass needle movable over the dial, and a bar magnet secured to the lower part of said pivot pin and located underneath the dial, said magnet being axially aligned with the needle and attracted by the electromagnet that is energized, whereby to actuate the compass needle and enable the student to visualize automatic radio compass procedure, said energizing means being selectively operable for additionally energizing a second electromagnet, whereby to deflect said needle away from the first said energized electromagnet and superposed station and simulate the effect of a thunderhead on the compass.

LEONARD S. HARTMAN.

REFERENCES CITED

The following references are of record in the file of this patent:

UNITED STATES PATENTS

| Number | Name | Date |
| --- | --- | --- |
| 2,352,216 | Melvin | June 27, 1944 |
| 2,358,793 | Crane | Sept. 26, 1944 |
| 2,389,359 | Grow | Nov. 20, 1945 |
| 2,326,764 | Crane | Aug. 17, 1943 |
| 2,179,663 | Link | Nov. 14, 1939 |
| 2,321,799 | Cone | June 15, 1943 |